United States Patent
Fuchigami (10) Patent No.: US 10,972,629 B2
(45) Date of Patent: Apr. 6, 2021

(54) IMAGE PROCESSING APPARATUS CONFIGURED TO COMBINE IMAGE INFORMATION SUCH THAT THE COMBINED FIRST IMAGE INFORMATION AND SECOND IMAGE INFORMATION HAVE THE FIRST RESOLUTION

(71) Applicant: TOSHIBA TEC KABUSHIKI KAISHA, Tokyo (JP)

(72) Inventor: Takahiro Fuchigami, Yokosuka Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/567,524

(22) Filed: Sep. 11, 2019

(65) Prior Publication Data
US 2021/0075932 A1 Mar. 11, 2021

(51) Int. Cl.
*H04N 1/387* (2006.01)
*H04N 1/21* (2006.01)
*H04N 1/393* (2006.01)

(52) U.S. Cl.
CPC ......... *H04N 1/3871* (2013.01); *H04N 1/2104* (2013.01); *H04N 1/3935* (2013.01); *H04N 2201/0094* (2013.01)

(58) Field of Classification Search
USPC ..... 358/1.1–3.29, 1.11–1.18, 426.04–426.06, 358/452, 513–540
See application file for complete search history.

(56) References Cited

U.S. PATENT DOCUMENTS

| | | | |
|---|---|---|---|
| 2004/0246507 A1* | 12/2004 | Hattori | H04N 1/3871 358/1.2 |
| 2012/0154828 A1* | 6/2012 | Tanaka | G06K 15/1853 358/1.2 |
| 2014/0063031 A1* | 3/2014 | Brasnett | G06T 1/60 345/536 |

FOREIGN PATENT DOCUMENTS

JP 2007-055265 A2 3/2007

* cited by examiner

*Primary Examiner* — Marcellus J Augustin
(74) *Attorney, Agent, or Firm* — Foley & Lardner LLP (57) ABSTRACT

An image processing apparatus is an image processing apparatus that performs image processing on first image information of a target first image. The image processing apparatus has a controller and a first storage device which stores second image information of a second image. The controller reads the second image information stored in the first storage device, changes a resolution of the read second image information to a first resolution which is the same as a resolution of the first image information, and combines the first image information and the second image information based on the first image information and the second image information of which resolution is changed to the first resolution.

15 Claims, 4 Drawing Sheets

IMAGE PROCESSING APPARATUS CONFIGURED TO COMBINE IMAGE INFORMATION SUCH THAT THE COMBINED FIRST IMAGE INFORMATION AND SECOND IMAGE INFORMATION HAVE THE FIRST RESOLUTION

FIELD

Embodiments described herein relate generally to an image processing apparatus.

BACKGROUND

In a related art, an image processing apparatus can combine second image information stored in advance with target first image information and performs image processing on the first image information after being combined. In such combining processing, a resolution of the second image information needs to match a resolution of the first image information. However, the resolution of the first image information is different for each piece of image information used as the first image information. Therefore, in the image processing apparatus, when the resolution of the image information used as the first image information is increased, the resolution of the second image information also needs to be increased. Under such circumstances, the image processing apparatus needs to have a page memory capable of temporarily storing the second image information of the highest resolution among resolutions that can be selected as the resolution of the first image information. As a result, in the image processing apparatus, a capacity of the page memory is less likely to be reduced in some cases. In addition, in the image processing apparatus, the capacity of the page memory may not be reduced, and thus manufacturing cost is less likely to be reduced in some cases.

DETAILED DESCRIPTION

In general, according to one embodiment, an image processing apparatus includes a controller and a first storage device. The first storage device is configured to stores second image information of a second image. The controller is configured to read the second image information stored in the first storage device, change a second resolution of the second image information to a first resolution of the first image information, and combine the first image information and the second image information at the first resolution.

Hereinafter, an image processing apparatus according to an embodiment will be described with reference to drawings. In each drawing, the same reference numeral is given to the same configuration. Hereinafter, an image processing apparatus 100 will be described as an example of the image processing apparatus according to the embodiment.

Details of Image Processing Apparatus

Hereinafter, the details of the image processing apparatus 100 will be described with reference to FIG. 1.

Figure 1:
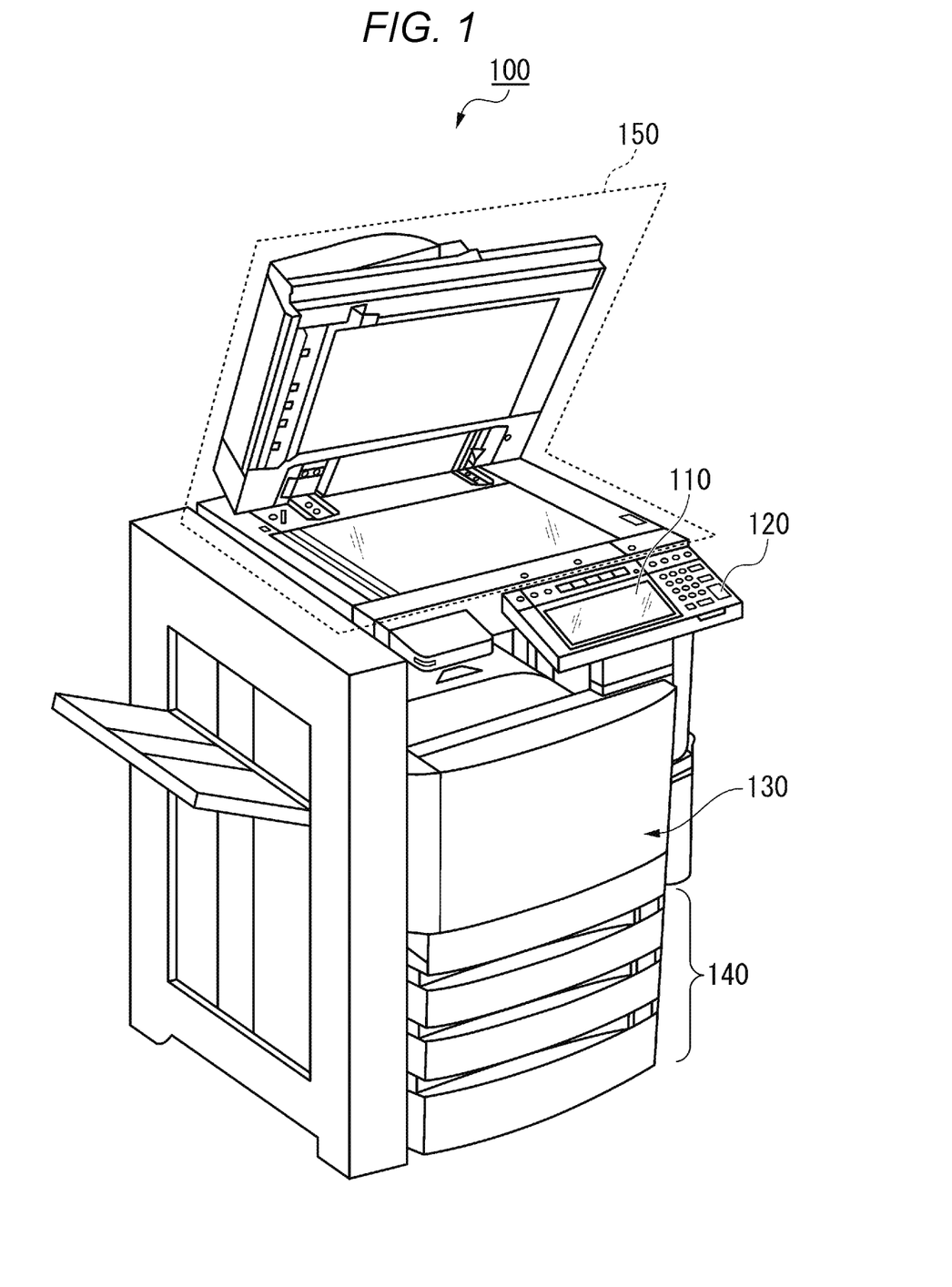
FIG. 1 is an external view illustrating an example of an overall configuration of an image processing apparatus according to an embodiment.

FIG. 1 is an external view illustrating an example of an overall configuration of the image processing apparatus 100 according to the embodiment.

The image processing apparatus 100 is an apparatus that performs image processing, such as a multifunctional machine, a scanner, and a facsimile (FAX). Image processing is processing relating to an image. The image processing is, for example, processing of forming an image on a sheet, processing of reading image information to be read, processing of recording (storing) image information, processing of transmitting an image to another apparatus, and the like.

The image processing apparatus 100 includes a display 110, a control panel 120, a printer unit (printer) 130, a sheet accommodation unit (sheet holder) 140, and an image reading unit (image reader or scanner) 150. The printer unit 130 of the image processing apparatus 100 may be a device for fixing a toner image or an inkjet device.

The image processing apparatus 100 reads an image appearing on a sheet, generates digital data, and generates an image file. The sheet is, for example, an original document, paper on which characters, images, and the like are described, or the like. The sheet may be anything as long as the thing can be read by the image processing apparatus 100.

The display 110 is an image display device such as a liquid crystal display, an organic electro luminescence (EL) display, or the like. The display 110 displays various types of information on the image processing apparatus 100.

The control panel 120 has a plurality of buttons. The control panel 120 receives a user's operation. The control panel 120 outputs a signal corresponding to the operation performed by the user to the control unit of the image processing apparatus 100. The display 110 and the control panel 120 may be configured as an integral touch panel.

The printer unit 130 forms an image on a sheet based on the image information generated by the image reading unit 150 or the image information received via a communication path. The printer unit 130 forms an image by the following processing, for example. The image forming unit of the printer unit 130 forms an electrostatic latent image on a photosensitive drum based on the image information. The image forming unit of the printer unit 130 forms a visible image by attaching the developer to the electrostatic latent image. A specific example of the developer is a toner. A transfer unit of the printer unit 130 transfers the visible image onto the sheet. A fixing unit of the printer unit 130 fixes the visible image on the sheet by heating and pressurizing the sheet. The sheet on which an image is to be formed may be a sheet accommodated in the sheet accommodation unit 140 or may be a sheet set by hand.

The sheet accommodation unit 140 accommodates a sheet used for image formation in the printer unit 130.

The image reading unit 150 reads image information to be read as brightness and darkness of light. The image reading unit 150 records the read image information. The recorded image information may be transmitted to another information processing device via the network. The recorded image information may be formed as an image on the sheet by the printer unit 130.

Functional Configuration of Image Processing Apparatus

Hereinafter, a functional configuration of the image processing apparatus 100 will be described with reference to FIG. 2.

Figure 2:
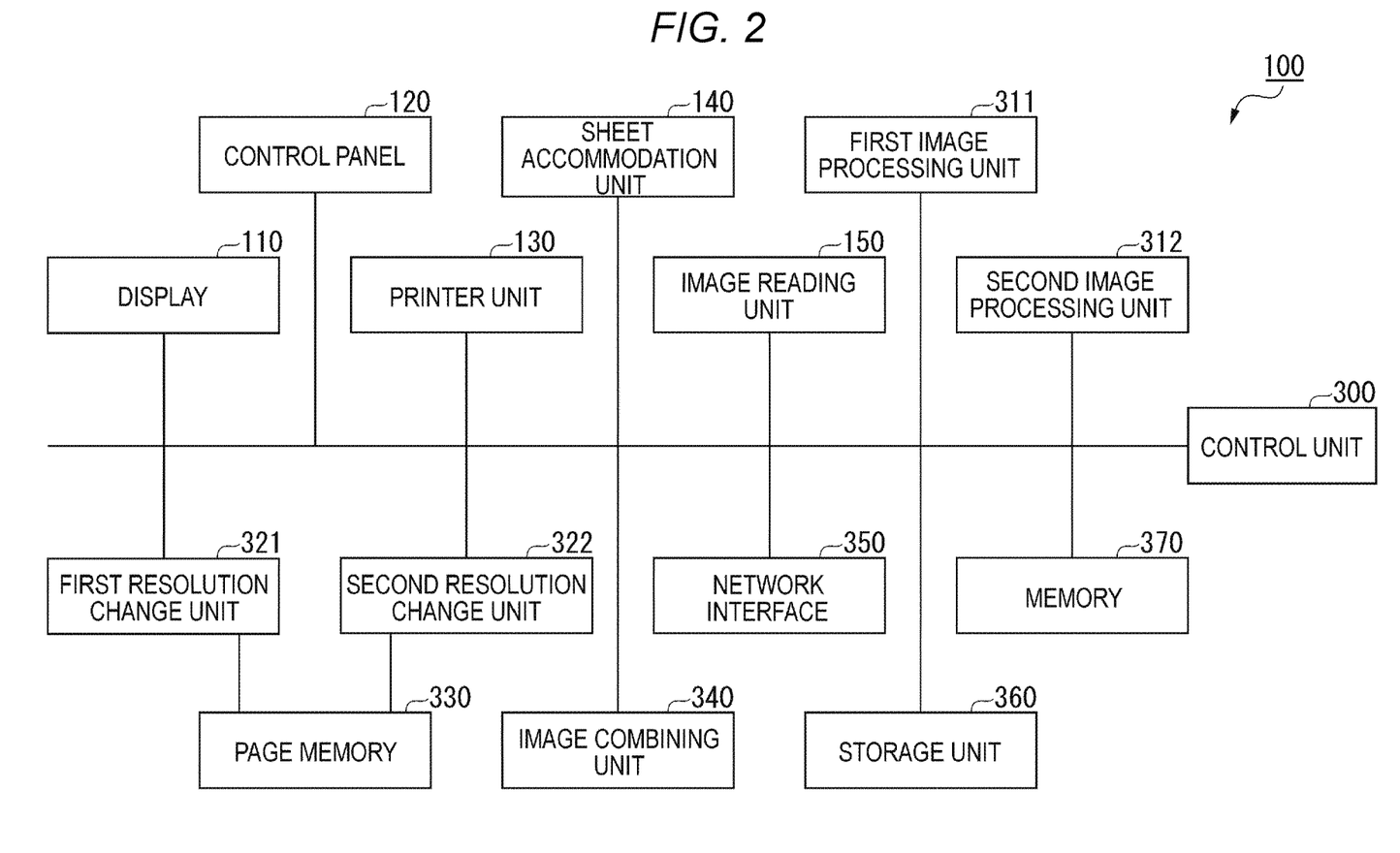
FIG. 2 is a view illustrating an example of a functional configuration of the image processing apparatus.

FIG. 2 is a view illustrating an example of the functional configuration of the image processing apparatus 100.

The image processing apparatus 100 includes the display 110, the control panel 120, the printer unit 130, the sheet accommodation unit 140, and the image reading unit 150. The image processing apparatus 100 further includes a control unit (a controller) 300, a first image processing unit (image processor) 311, a second image processing unit (image processor) 312, a first resolution change unit 321, and a second resolution change unit 322. The image processing apparatus 100 further includes a page memory 330, an image combining unit 340, a network interface 350, a storage unit (storage memory) 360, and a memory 370. These respective functional units included in the image processing apparatus 100 are communicably connected via a system bus.

The display 110, the control panel 120, the printer unit 130, the sheet accommodation unit 140, and the image reading unit 150 are the same as those described above, and thus the description thereof is omitted. Hereinafter, the control unit 300, the first image processing unit 311, the second image processing unit 312, the first resolution change unit 321, the second resolution change unit 322, the page memory 330, the image combining unit 340, the network interface 350, the storage unit 360, and the memory 370 will be described. One or both of the first image processing unit 311 and the second image processing unit 312 may be included in the control unit 300. Further, one or both of the first resolution change unit 321 and the second resolution change unit 322 may be included in the control unit 300. In addition, one or both of the page memory 330 and the image combining unit 340 may be included in the control unit 300. The page memory 330 is an example of a first storage unit. In addition, the storage unit 360 is an example of a second storage unit.

The control unit 300 is an example of a control unit of the image processing apparatus 100. The control unit 300 includes a central processing unit (CPU) of the image processing apparatus 100. The control unit 300 controls the operation of each functional unit of the image processing apparatus 100. The control unit 300 executes various types of processing by executing a program. The control unit 300 acquires an instruction input by the user from the control panel 120. That is, the control unit 300 receives an operation from the user via the control panel 120. The control unit 300 executes control processing based on the acquired instruction.

The first image processing unit 311 performs predetermined first image processing on image information. In response to a request from the control unit 300, the first image processing unit 311 performs the first image processing on the image information indicated by the request. The image information indicated by the request is, for example, image information read by the image reading unit 150 or the like. In addition, the image information indicated by the request is, for example, image information stored in the storage unit 360 or the like. The first image processing includes, for example, processing such as color conversion and filtering. The color conversion is processing of converting image information as RGB (Red Green Blue) data into image information as CMYK (Cyan Magenta, Yellow Key plate) data. The filtering is processing of applying a filter such as a filter for removing noise from image information and a filter for enhancing an edge of image information. In the present embodiment, the first image processing unit 311 is configured with hardware. The first image processing unit 311 may be configured with a program executed by the CPU included in the control unit 300.

The second image processing unit 312 performs predetermined second image processing on image information. In response to a request from the control unit 300, the second image processing unit 312 performs second image processing on the image information indicated by the request. The image information indicated by the request is, for example, image information read by the image reading unit 150 or the like. In addition, the image information indicated by the request is, for example, image information stored in the storage unit 360 or the like. The second image processing includes, for example, processing such as color conversion and filtering. In the present embodiment, the second image processing unit 312 is configured with hardware. The second image processing unit 312 may be configured with a program executed by the CPU included in the control unit 300.

Here, the second image processing unit 312 performs the second image processing on image information that is different from the image information to be subjected to the first image processing by the first image processing unit 311. However, the first image processing and the second image processing are image processing with the same (or substantially the same) content. Therefore, when the first image processing and the second image processing are not performed in parallel, the first image processing unit 311 and the second image processing unit 312 may be configured as one image processing unit.

The first resolution change unit 321 changes a resolution of image information. The image information is image information stored in the page memory 330 described later. The first resolution change unit 321 reads the image information stored in the page memory 330 from the page memory 330 in response to a request from the control unit 300. The first resolution change unit 321 changes the resolution of the read image information to a first resolution specified by the control unit 300. The method of changing the resolution of the image information to the first resolution by the first resolution change unit 321 may be a method to be developed. The first resolution will be described later.

The second resolution change unit 322 changes a resolution of image information. The image information is image information on which the second image processing is performed by the second image processing unit 312. In response to a request from the control unit 300, the second resolution change unit 322 changes the resolution of the image information to a predetermined second resolution. The method of changing the resolution of the image information to the second resolution by the second resolution change unit 322 may be a method to be developed. The second resolution will be described later.

The page memory 330 is, for example, a random-access memory (RAM). The page memory 330 temporarily stores image information. The page memory 330 temporarily stores, for example, the image information of which resolution is changed to the second resolution by the second resolution change unit 322. The page memory 330 is a memory separate from the memory 370 in the example illustrated in FIG. 2, but may be integrated with the memory 370.

The image combining unit 340 combines two pieces of image information as CMYK data in response to a request from the control unit 300. The image combining unit 340 combines the two pieces of image information by, for example, multiplying the pixel value of each of the two pieces of image information by a weighting factor and adding the result for each color component. At this time, the image combining unit 340 reads the two pieces of image information in synchronization with one of the two images.

The image combining unit 340 may be configured to combine the two pieces of image information by another method.

The network interface 350 exchanges data with other devices. The network interface 350 operates as an input interface and receives data transmitted from another device. Also, the network interface 350 operates as an output interface and transmits data to another device.

The storage unit 360 is an auxiliary storage device such as a hard disk or a solid-state drive (SSD), for example. The storage unit 360 stores various types of information.

The memory 370 is, for example, a random-access memory (RAM). The memory 370 temporarily stores information used by each functional unit of the image processing apparatus 100. The memory 370 may store image information read by the image reading unit 150, a program for operating each functional unit, and the like.

Image Combining Processing of Combining Second Image Information with First Image Information Hereinafter, among the processing performed by the control unit 300 in the image processing apparatus 100, image combining processing of combining the second image information with the first image information will be described with reference to FIG. 3. The first image information is image information of the first image. The first image is an image on which the user of the image processing apparatus 100 performs image processing by the image processing apparatus 100. Therefore, the first image may be any image desired by the user. The second image information is image information of the second image. The second image is a desired image that the user wants to combine with the first image. The second image is, for example, a fixed form image, or a template image. The fixed form image is an image on which a ruled line, a pattern, a fixed phrase, and the like are drawn. The second image may be another image instead of the fixed form image.

Figure 3:
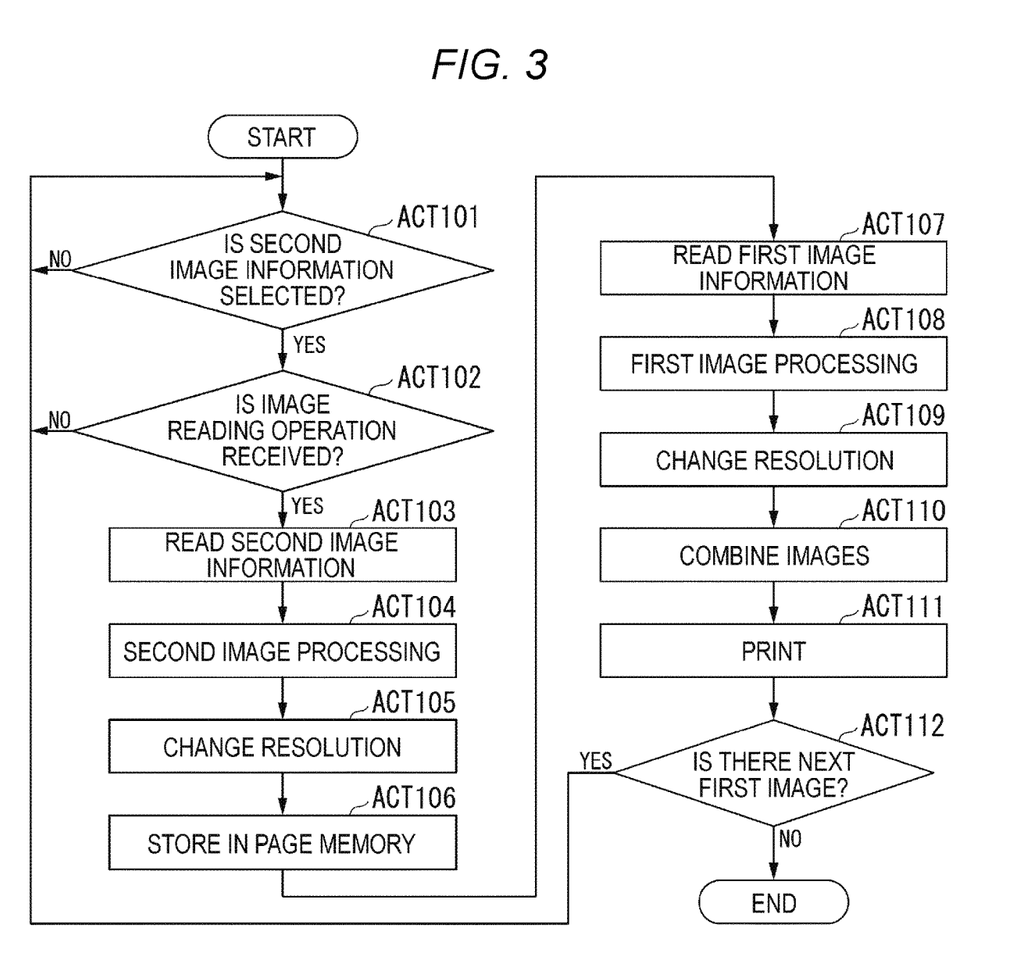
FIG. 3 is a view illustrating an example of flow of image combining processing performed by a control unit.

FIG. 3 is a view illustrating an example of flow of image combining processing performed by the control unit 300. In FIG. 3, image combining processing executed when the image processing apparatus 100 is caused to print the first image information after being combined with the second image information, will be described as an example. In the following, as an example, a case where the first image is arranged so that the image reading unit 150 can read the first image information at a prior timing will be described. The prior timing is a timing before processing of ACT 101 illustrated in FIG. 3 is performed. In the following, as an example, a case where the control unit 300 receives an operation for setting the resolution of the image reading unit 150 from the user of the image processing apparatus 100 in advance will be described. The resolution of the image reading unit 150 is a resolution when the image reading unit 150 reads image information from an image. For example, the user can select one resolution among a plurality of resolutions as the resolution of the image reading unit 150 in the image processing apparatus 100. The plurality of resolutions is, for example, four resolutions of 200 dpi, 300 dpi, 400 dpi, and 600 dpi. The plurality of resolutions may be a plurality of other resolutions instead of the four resolutions.

The control unit 300 stands by until one of the one or more pieces of image information stored in the storage unit 360 is selected as the second image information (ACT 101). For example, when the control unit 300 receives a second image information selection operation, the control unit 300 determines that one of the one or more pieces of image information is not selected as the second image information. The second image information selection operation is an operation of selecting one of the one or more pieces of image information as the second image information.

When one of the one or more pieces of image information stored in the storage unit 360 is selected as the second image information (ACT 101: YES), the control unit 300 determines whether or not an image reading operation is received (ACT 102). The image reading operation is an operation that causes the image reading unit 150 to read the image information of the image from the image desired by the user.

When the control unit 300 determines that the image reading operation is not received (ACT 102: NO), the processing proceeds again to ACT 101. Then, the control unit 300 stands by again in ACT 101 until one of the one or more pieces of image information stored in the storage unit 360 is selected as the second image information.

When the control unit 300 determines that the image reading operation is received (ACT 102: YES), the control unit 300 reads the second image information from the storage unit 360 (ACT 103). More specifically, in this case, the control unit 300 reads the image information selected as the second image information by the user in ACT 101 from the storage unit 360 as the second image information.

Next, the control unit 300 causes the second image processing unit 312 to perform the second image processing on the second image information read in ACT 103 (ACT 104).

Next, the control unit 300 causes the second resolution change unit 322 to change the resolution of the second image information on which the second image processing is performed in ACT 104 to the second resolution (ACT 105). More specifically, when the resolution of the second image information is higher than the second resolution in ACT 105, the control unit 300 reduces the resolution of the second image information to the second resolution. However, when the resolution of the second image information is lower than the second resolution in ACT 105, the control unit 300 raises the resolution of the second image information to the second resolution. Thus, the image processing apparatus 100 can cause the user to select desired image information as the second image information without making the user aware of the resolution of the image information. Moreover, the image processing apparatus 100 can keep the resolution of the second image information constant. As a result, the image processing apparatus 100 can reduce the manufacturing cost. The reason is that in the image processing apparatus 100 when the resolution of the second image information is not kept constant, the capacity of the page memory 330 for temporarily storing the second image information is necessary to be increased.

Here, the second resolution is a resolution lower than the resolution set in advance in the image reading unit 150. In other words, the second resolution is a resolution lower than the resolution of the image information read by the image reading unit 150. For example, the second resolution change unit 322 specifies the resolution set in the image reading unit 150 and specifies a resolution obtained by reducing the specified resolution by predetermined value times as the second resolution. Then, the second resolution change unit 322 changes the resolution of the second image information on which the second image processing is performed in ACT 104 to the specified second resolution (i.e., to be at the reduced resolution). Here, the predetermined value may be any value as long as the value is higher than 0 and less than 1. Thus, the image processing apparatus 100 can suppress an upper limit value of the resolution of the second image information to a resolution obtained by multiplying the maximum resolution that can be set in the image reading unit 150 by a predetermined value. As a result, the image processing apparatus 100 can reduce the capacity of the page memory 330. That is, as the image processing apparatus 100 reduces the capacity of the page memory 330, the manufacturing cost can be reduced. In addition, the image processing apparatus 100 can suppress that the transmission band when reading the second image information from the page memory 330 becomes narrow. This is because the amount of data of the second image information decreases as the resolution of the second image information decreases.

Hereinafter, a case where the predetermined value is 0.5 will be described as an example. The second resolution may be, for example, a resolution lower than the lowest resolution among the user-selectable resolutions of the image reading unit 150. In this case, the second resolution is, for example, half a resolution of the lowest resolution among the user-selectable resolutions of the image reading unit 150. Thereby, the image processing apparatus 100 can reduce the manufacturing cost more reliably. Also, as a result, the image processing apparatus 100 can more reliably suppress that the transmission band when reading the second image information from the page memory 330 becomes narrow.

Next, the control unit 300 causes the page memory 330 to store the second image information of which resolution is changed in ACT 105 (ACT 106).

Next, the control unit 300 causes the image reading unit 150 to read the first image information from the first image (ACT 107).

Next, the control unit 300 causes the first image processing unit 311 to perform the first image processing on the first image information read by the image reading unit 150 in ACT 107 (ACT 108).

Next, the control unit 300 causes the second resolution change unit 322 to read the second image information stored in the page memory 330 in ACT 106 from the page memory 330. Then, the control unit 300 changes the resolution of the second image information read by the second resolution change unit 322 to the first resolution (ACT 109). The first resolution is the same resolution as the resolution of the first image information read in ACT 107. For example, in ACT 109, the control unit 300 specifies the resolution set in the image reading unit 150 as the first resolution. Then, the control unit 300 changes the resolution of the second image information to the specified first resolution. Also, for example, in ACT 109, the control unit 300 specifies the resolution of the first image information as the first resolution based on the first image information. Then, the control unit 300 changes the resolution of the second image information to the specified first resolution. Thus, in ACT 109, the control unit 300 specifies the resolution of the first image information as the first resolution by some method. Then, the control unit 300 changes the resolution of the second image information to the specified first resolution. Thereby, the image processing apparatus 100 can match the resolution of the first image information with the resolution of the second image information regardless of the resolution of the second image information stored in the page memory 330. As a result, in the image processing apparatus 100, for example, the capacity of the page memory 330 can be reduced, and the manufacturing cost can be reduced. Further, for example, even if the resolution of the second image information has to be set higher than the first resolution for some reason, the image processing apparatus 100 can match the resolution of the first image information with the resolution of the second image information.

Next, the control unit 300 causes the image combining unit 340 to combine the first image information and the second image information (ACT 110). Here, the first image information is the first image information on which the first image processing in ACT 108 is performed. The second image information is the second image information of which resolution is changed to the first resolution in ACT 109.

Next, the control unit 300 controls the printer unit 130 to form an image on a sheet based on the first image information after being combined with the second image information in ACT 110. That is, the control unit 300 prints the image of the first image information (ACT 111).

Next, the control unit 300 determines whether or not there is an image for the image reading unit 150 to read the image information as a next first image (ACT 112).

When the control unit 300 determines that there is an image for the image reading unit 150 to read image information as the next first image (ACT 112: YES), the processing proceeds to ACT 101. Then, the control unit 300 stands by again in ACT 101 until one of the one or more pieces of image information stored in the storage unit 360 is selected as the second image information.

However, when the control unit 300 determines that there is no image for the image reading unit 150 to read image information as the next first image (ACT 112: NO), the processing is ended.

As described above, the image processing apparatus 100 changes the resolution of the second image information read from the page memory 330 to the first resolution which is the same as the resolution of the first image information read by the image reading unit 150. Thus, in the image processing apparatus 100, the capacity of the page memory 330 does not have to be a capacity in accordance with the resolution of the image reading unit 150. The capacity in accordance with the resolution of the image reading unit 150 is a capacity sufficient to store image information having the same resolution as the resolution of the image reading unit 150, in the capacity of the page memory 330. As a result, the image processing apparatus 100 can reduce the manufacturing cost.

The control unit 300 described above may have a configuration in which the processing of ACT 104 is omitted. In this case, the image processing apparatus 100 may not include the first image processing unit 311.

Further, the control unit 300 described above may have a configuration in which the processing of ACT 105 is omitted. In this case, the image processing apparatus 100 may not include the second resolution change unit 322.

Further, the control unit 300 described above may have a configuration in which the processing of ACT 108 is omitted. In this case, the image processing apparatus 100 may not include the second image processing unit 312.

Further, as long as the second resolution described above is a resolution lower than the maximum resolution that can be set in the image reading unit 150, the second resolution may be a resolution higher than the resolution set in advance in the image reading unit 150. In this case, in ACT 109, the control unit 300 reduces the resolution of the second image information to the first resolution. In addition, in this case, the image processing apparatus 100 can suppress the capacity of the page memory 330 to a capacity sufficient to store image information having a resolution lower than the maximum resolution that can be set in the image reading unit 150. As a result, the image processing apparatus 100 can suppress an increase in the manufacturing cost.

The control unit 300 described above may be configured to read, as the second image information, image information selected from among one or more pieces of image information stored in an external storage device in ACT 103. In this case, the external storage device is an example of the second storage unit.

In addition, the control unit 300 described above may be configured to obtain the first image information from an external storage device such as an external flash memory in ACT 107 illustrated in FIG. 3. In this case, for example, the second resolution change unit 322 specifies the resolution of the first image information stored in the storage device and specifies a resolution obtained by reducing the specified resolution by predetermined value times as the second resolution. Thereby, even when acquiring the first image information from the external storage device in ACT 107, the image processing apparatus 100 can obtain the same effect as that of the embodiment described above.

The image processing apparatus 100 described above may not include the image reading unit 150. In this case, in ACT 107 illustrated in FIG. 3, for example, the control unit 300 acquires the first image information from an external storage device such as an external flash memory. In this case, for example, the second resolution change unit 322 specifies the resolution of the first image information stored in the storage device and specifies a resolution obtained by reducing the specified resolution by predetermined value times as the second resolution. Thus, with the image processing apparatus 100, it is possible to set the capacity of the page memory 330 to a capacity desired by a manufacturer of the image processing apparatus 100. As a result, the image processing apparatus 100 can reduce the manufacturing cost.

Specific Example of First Image and Second Image

Figure 4:
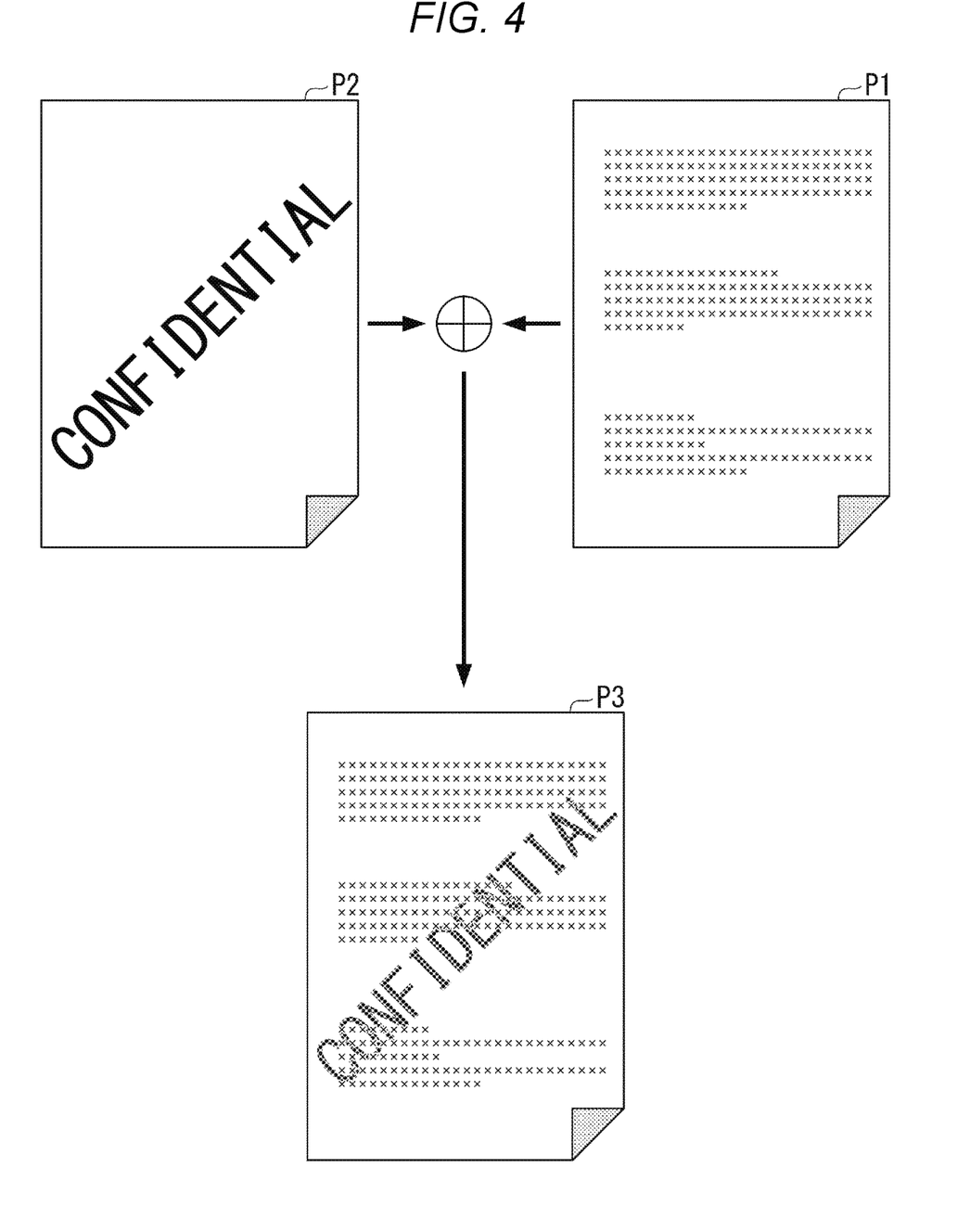
FIG. 4 is a view illustrating each of a first image and a second image.

Hereinafter, a specific example of the first image and the second image will be described with reference to FIG. 4. FIG. 4 is a view illustrating each of the first image and the second image.

An image P1 illustrated in FIG. 4 is an example of the first image. The image P1 is a document in which various types of information are put together, and is, for example, a project proposal, a report, and the like.

Meanwhile, an image P2 illustrated in FIG. 4 is an example of the second image. The image P2 is, for example, a fixed form image, as described above. In the example illustrated in FIG. 4, the image P2 is an image in which a fixed phrase of confidential is drawn.

Then, an image P3 illustrated in FIG. 4 is an example of an image formed based on the image information obtained by combining the image information of the image P1 and the image information of the image P2 by the image processing apparatus 100.

When combining the images as illustrated in FIG. 4, the image processing apparatus 100 can receive the above-described weighting factor via the control panel 120. The image processing apparatus 100 causes the image combining unit 340 to combine the image information of the image P1 and the image information of the image P2 based on the received weighting factor. As a result, the image processing apparatus 100 can combine the image information of the low-density image P2 with the image information of the image P1.

In addition, as illustrated in FIG. 4, the fixed form image is rarely an image in which a figure which is easily lost at the time of formation of an image on a sheet, such as a thin line or a small point, is drawn. The figure is, for example, a ruled line. For this reason, in the image processing apparatus 100, even when the resolution of the second image information before being stored in the page memory 330 is lowered, it is considered that there are few problems with the image quality.

As described above, the image processing apparatus (in the example described above, the image processing apparatus 100) performs image processing on the first image information of the target first image. The image processing apparatus includes a control unit and a first storage unit (in this example, the page memory 330). The first storage unit stores the second image information of the second image. The control unit reads the second image information stored in the first storage unit, changes the resolution of the read second image information to the first resolution which is the same as the resolution of the first image information, and combines the first image information and the second image information based on the first image information and the second image information of which resolution is changed to the first resolution. That is, the first and second image information are combined so as to be of the same resolution, i.e., the first resolution. Thus, with the image processing apparatus, it is possible to set the capacity of the first storage unit to a capacity desired by the manufacturer of the image processing apparatus 100, for example. As a result, the image processing apparatus can reduce the manufacturing cost.

Further, as described above, the image processing apparatus (in this example, the image processing apparatus 100) is an image processing apparatus that performs image processing on the first image information of the target first image. The image processing apparatus includes a control unit (in this example, the control unit 300), a first storage unit (in this example, the page memory 330), and an image reading unit (in this example, the image reading unit 150). The first storage unit stores the second image information of the second image. The image reading unit reads image information of an image in response to a request from the control unit. The control unit reads the second image information stored in the first storage unit, changes the resolution of the read second image information to the first resolution which is the same as (identical to) the resolution of the first image information read by the image reading unit, and combines the first image information and the second image information based on the first image information read by the image reading unit and the second image information of which resolution is changed to the first resolution. Thus, with the image processing apparatus, for example, it is possible to set the capacity of the first storage unit smaller than the capacity in accordance with the resolution of the image reading unit. As a result, the image processing apparatus can reduce manufacturing cost. Here, the resolution of the image reading unit is, in other words, the resolution of the first image information. The capacity in accordance with the resolution of the image reading unit is a capacity sufficient to store image information having the same resolution as the resolution of the image reading unit, in the capacity of the first storage unit.

In addition, the image processing apparatus may change the resolution of the second image information to the predetermined second resolution and cause the first storage unit to store the second image information of which resolution is changed to the second resolution. Here, the second resolution is a resolution that is different from the resolution of the first image information. Thus, the image processing apparatus can keep the capacity of the first storage unit constant and can reduce the overall capacity.

In the image processing apparatus, the second resolution may be a resolution lower than the resolution of the image reading unit. Thereby, the image processing apparatus can more reliably reduce the capacity of the first storage unit.

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image processing apparatus, comprising:
a first storage device configured to store second image information of a second image;
a controller; and
an image reader configured to read image information of an image in response to receiving a request from the controller, wherein the controller is configured to:
read the second image information stored in the first storage device;
change a second resolution of the second image information to a first resolution of first image information of a target first image, the first resolution identical to a resolution of the image information read by the image reader;
and combine the first image information and the second image information based on the image information read by the image reader and the second image information of which resolution is changed to the first resolution, such that the combined first image information and second image information have the first resolution, wherein
the second resolution of the second image information is lower than a resolution of the image reader.

2. The apparatus according to claim 1, wherein the controller is further configured to:
perform predetermined first image processing on the first image information; and
combine the first image information and the second image information based on at least a portion of the first image information on which the first image processing is performed.

3. The apparatus according to claim 1, wherein the controller is further configured to:
change the second resolution to a predetermined resolution; and
cause the first storage device to store the predetermined resolution, wherein
the predetermined resolution is different from the first resolution.

4. The apparatus according to claim 3, wherein the controller is further configured to:
perform predetermined second image processing on the second image information;
change the second resolution of the second image information on which the second image processing is performed to the predetermined resolution; and
cause the first storage device to store the second image information at the predetermined resolution.

5. The apparatus according to claim 3, wherein the controller is further configured to:
read image information stored in a second storage device as the second image information in response to a reading operation; and
change the second resolution of the second image information to the predetermined resolution.

6. The apparatus according to claim 5, wherein the controller is further configured to cause the second storage device to store image information acquired from another device as at least a portion of the read image information in response to the reading operation.

7. The apparatus according to claim 5, further comprising:
an image reader is configured to read image information of an image in response to receiving a request from the controller, wherein
the controller is configured to causes the second storage device to store the image information read by the image reader as at least a portion of the read image information in response to the reading operation.

8. The apparatus according to claim 1, wherein the second resolution of the second image information is lower than any of user-selectable resolutions of the image reader.

9. The apparatus according to claim 8, wherein the second resolution of the second image information is half of a resolution of a lowest resolution among the user-selectable resolutions of the image reader.

10. An image processing apparatus, comprising:
a controller;
a first storage device configured to store second image information of a second image; and
an image reader configured to read first image information of an image in response to receiving a request from the controller, wherein
the controller is configured to:
read the second image information stored in the first storage device;
change a second resolution of the second image information to a first resolution that is identical to a resolution of the first image information read by the image reader; and
combine the first image information and the second image information at the first resolution, wherein
the second resolution of the second image information is lower than a resolution of the image reader.

11. The image processing apparatus according to claim 10, wherein
the controller is further configured to:
perform predetermined first image processing on the first image information; and
combine the first image information and the second image information based on at least a portion of the first image information on which the first image processing is performed.

12. The image processing apparatus according to claim 10, wherein
the controller is further configured to:
change the second resolution to a predetermined resolution; and
cause the first storage device to store the predetermined resolution, the predetermined resolution being different from the first resolution.

13. A method, comprising:
storing second image information of a second image in a storage device;
reading the second image information from the storage device;
reading first image information of a first image, the first image information associated with a first resolution;
changing a second resolution of the second image information stored in the storage device to the first resolution;

combining the first image information and the second image information at the first resolution; and printing the combined first and second image information on a sheet, wherein the second resolution of the second image information is lower than a resolution of an image reader.

14. The method according to claim 13, further comprising:

performing predetermined first image processing on the first image information; and combining the first image information and the second image information based on at least a portion of the first image information on which the first image processing is performed.

15. The method according to claim 13, further comprising:

changing the second resolution to a predetermined resolution; and causing the storage device to store the predetermined resolution, the predetermined resolution being different from the first resolution.

\* \* \* \* \*